J. E. BERING.
Assignor, by mesne assignments, to CHAMBERS, BERING, QUINLAN COMPANY.
CORN PLANTER.
No. 10,320. Reissued May 1, 1883.
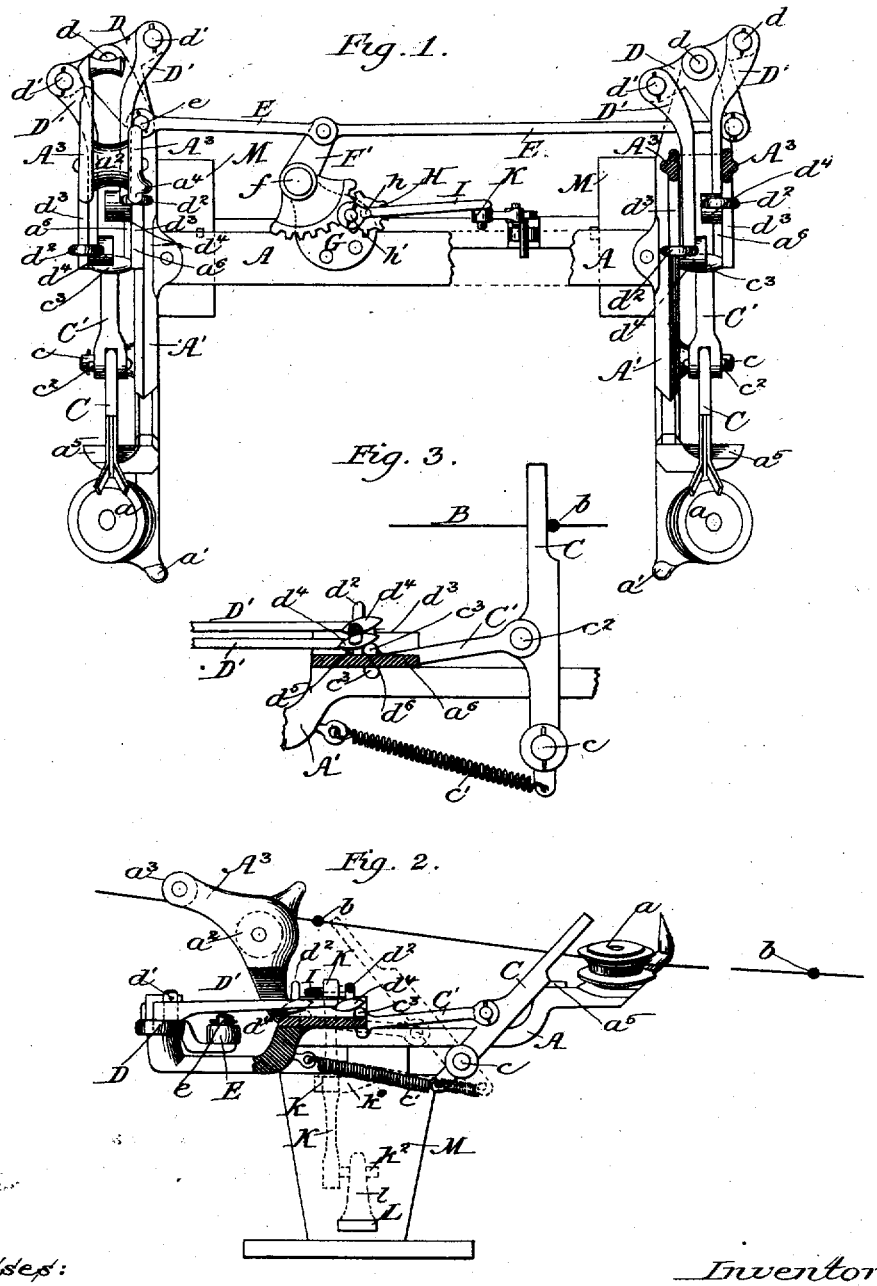
Witnesses:
Frank S. Blanchard
Harry M. Richards.
Inventor:
James Edward Bering,
By W. B. Richards,
Attorney.
N. PETERS, Photo-Lithographer, Washington, D. C.

UNITED STATES PATENT OFFICE.

JAMES E. BERING, OF DECATUR, ILLINOIS, ASSIGNOR, BY MESNE ASSIGNMENTS, TO CHAMBERS, BERING, QUINLAN COMPANY, OF SAME PLACE.

CORN-PLANTER.

SPECIFICATION forming part of Reissued Letters Patent No. 10,320, dated May 1, 1883.

Original No. 272,404, dated February 20, 1883. Application for reissue filed April 3, 1883.

*To all whom it may concern:*

Be it known that I, JAMES EDWARD BERING, a citizen of the United States, and a resident of Decatur, in the county of Macon and State of Illinois, have invented certain new and useful Improvements in Corn-Planters; and I do hereby declare the following is a full, clear, and exact description of the invention, that will enable others skilled in the art to which it appertains to make and use the same, reference being had to the accompanying drawings, and to the letters of reference marked thereon, which form a part of this specification.

Figure 1 is a top plan, Fig. 2 is a side elevation, partly in section, and Fig. 3 an elevation of details, of parts of a corn-planter, and a check-row attachment embodying my invention.

The invention relates to corn-planters of that class in which a knotted check-row wire or cord stretched across a field is made to automatically actuate the seeding mechanism of the planter at proper times through the medium of certain devices mounted on the planter as attachments thereto.

The invention consists of certain improvements in the construction and combination of these devices or attachments, substantially as hereinafter described and claimed.

Referring to the drawings, in which like letters designate like parts, A represents the ordinary bar, attached transversely to the planting-machine, and carrying at its ends the head-bars A′ A′. The head-bars have at their front ends the usual guide-pulleys, $a$, and projecting fingers $a'$, and near their rear ends have two upright arms or standards, $A^3$, between which are journaled the guide-pulleys, $a^2$, an extension of one of the arms $A^3$ serving to support the journal of guide-pulley $a^3$, while the other of said arms $A^3$ bears the projecting finger $a^4$. These several pulleys and fingers, as well understood, serve to sustain the knotted check-row cord or wire B in position to actuate the forked lever C, and to prevent the lateral displacement of the cord or wire by reason of any devious course or sudden jolting of the machine as it traverses the field. The lever C is pivoted to the head-bar, A′, as at $c$, a recoil spring, $c'$, being attached to the lower end of the lever and to the head-bar, respectively, so that after the knot $b$ of the cord B has passed free from the fork of the lever (see dotted lines, Fig. 2) the lever will be returned again quickly to its rest $a^5$, projecting from the bar A′, and be in readiness to catch the next knot of the cord.

C′ is a pitman or pawl, one end of which is journaled at $c^2$ to a lug which projects laterally from the lever C, and its other end is provided with a cross-head, $c^3$, which embraces the elevated ways or bearings $a^6$, that serve as guideways for that end of the pitman or pawl C′.

To the rear end of the head-bar A′ is pivoted a rock-plate or bell-crank lever, D, as at $d$, which said plate carries the pawls or arms D′ D′, loosely pivoted thereto, as at $d'$, these pawls or arms being sustained at their front ends by the guards $d^2$, which are bent over and ride upon the straight parallel tracks $d^3$, projecting above the head-bar A′. The pawls D′ are curved slightly downward on their under side, as at $d^5$, and each terminates in a somewhat enlarged straight face, as at $d^6$, against which the cross-heads $c^3$ may snugly abut when reciprocated. Each pawl or arm D′ has a cam, $d^4$, projecting laterally from its distal end, and its side toward the other pawl D′. The lower sides of the cams $d^4$ are sloped or tapered upwardly at their front and rear sides, and their upper sides are sloped or tapered downwardly at their front and rear sides, as shown at Figs. 2 and 3, and these cams overlap in passing, as hereinafter described.

To the forward arm of the rocker-plate D there is pivoted, as at $e$, a connecting-rod, E, which at its opposite end is pivoted to the bent crank-arm F′ of a sector gear-wheel, F, pivotally mounted, as at $f$, on a stud projecting from a plate, G, attached to the transverse bar A. A stud-pin, $h$, projecting from the plate G, journals a pinion, H, which meshes with the sector-wheel F, and has its gear-teeth equal in number to those of said wheel.

To a wrist-pin, $h'$, projecting above the pinion H, is pivoted the connecting-rod I, the other end of which may be bent, as at $i$, to enter a perforation in the upper end of lever K, said lever having its fulcrum-pin $k$ on an arm or bracket, $k'$, projecting from the lower side of the transverse bar A, and engaging, by pin $k^2$, secured near its lower end, with the bifurcated arm $l$ of the reciprocating bar L, that connects with and operates the seed-slides in the hoppers M.

The several parts being constructed and arranged as hereinbefore described, and the machine in readiness to traverse the field, the check-row cord or wire B is arranged in position, as shown in Fig. 2, so that it shall be received within the fork of the lever C. As the knots $b$ upon the cord or wire meet the forward or forked end of the lever C in succession, they force said end of the lever backward about its pivot $c$, and in consequence the pitman C′ is carried back with said lever, the cross-head $c^3$ of the pitman moving evenly in the ways $a^6$ and abutting against the straight face $d^6$ of that pawl D′ which chances to be at the forward end of the tracks $d^3$. Said pawl D′ is in turn forced backward, thus causing the plate D to oscillate about its axis $d$, moving thereby the connecting-rod E, sector and pinion gear F H, rod I, lever K, bar L, and seed-slides in hoppers M. During the period that the pawl D′ is being forced backward by operation of the pitman C′ to oscillate the plate D its fellow pawl D′ on said plate is being advanced thereby to an extreme forward position in the tracks $d^3$, whereupon as the pawls near each other the cam $d^4$, attached to the advancing pawl, overrides the cam $d^4$ of the receding pawl, and thus lifts said advancing pawl, so that its face $d^6$ freely clears the cross-head $c^3$ and no obstruction or locking of the parts occurs. The bent guard $d^2$ of the pawl allows the same to be lifted, as described, without risk of displacing said pawl from position on the track $d^3$. The knot $b$ on cord B having carried the lever C backward so far that the fork of the lever no longer retains the knot, but allows it to slip away freely, the lever is quickly returned again to its original position by action of the spring $c'$, (full lines, Fig. 2,) and with it returns the pitman C′, the cross-head $c^3$ of which, when it meets the downcurve $d^5$ of the forward pawl D′, lifts said pawl and drops it again abruptly when it has cleared the front end of the pawl, so that the straight face $d^6$ thereof shall be in position and abutting squarely against the cross-head $c^3$, preparatory for the return-stroke.

The present invention is designed as an improvement upon Letters Patent No. 207,251, issued to W. B. Chambers and J. E. Bering, August 20, 1878, and differs therefrom in essential particulars, viz: The forked lever C is made to reciprocate the pitman C′, as hereinbefore described, in lieu of operating a rock-shaft and tappet, as in the older construction. The pitman C′ is at the end of its backward stroke when the cross-head $c^3$ and the pivot-points $c^2$ and $c$ are in line, and before the forked lever has completed its throw, and hence if the knot $b$ should slip away from the fork prematurely at this stage the slide-bar L will yet have been operated to its full throw and the seed regularly dropped, whereas in the older form it was necessary that the forked lever should be rocked backward by the knotted cord or wire much farther than just stated; otherwise the tappet would not throw the pawls a full stroke, and the seeding be correspondingly imperfect. Such imperfection must necessarily result at times, if for any reason the cord were to slip away prematurely from the clasp of the forked lever. The relation of pitman-pivot $c^2$ to the forked-lever pivot $c$ is such that, as already stated, the pitman accomplishes its full throw when the forked lever swings rearwardly far enough to bring the cross-head $c^3$ and pivot-points $c$ and $c^2$ in line. Consequently, during the rest of the backward movement of the forked lever, the cross-head of the pitman stands practically at rest in the ways, and meets no further resistance from the pawls, rock-plate, pinion, &c. It is plain that the strain on the forked lever, as on the knotted cord, is thereby relieved much earlier than was possible in the older form of machine. Again, by having the sector and pinion gear F H distinct from the rock-plate D, instead of being a part thereof, as heretofore, more freedom in movement is secured, at the same time the locking of the seed-slides in hopper M against accidental strains or jars is maintained, for, as to this latter, it will be noted that when the sector-wheel F has rotated pinion H in either direction, at the end of the movement the connecting-rod I will be at its dead-point with respect to wrist-pin $h'$, so that lever K, reciprocating bar L, and seed-slides are immovably held and not to be operated, except as sector-wheel F acts through the medium of rocker-plate D, pawls D′, and pitman C′ to rotate pinion H reversely again through one half-revolution. The displacement of the parts through movement of the seed-slides from movements of the planter is thereby prevented.

Not restricting myself to the precise details of structure herein set forth, and having thus described the invention, what I claim as new, and desire to secure by Letters Patent, is—

1. In a check-row corn-planter, the combination, with the forked lever and with a pivoted pitman having a cross-head sustained in guideways, of the parallel reciprocating pawls and a rock-plate, the relation of the parts being such that the strain on the forked lever is relieved when the cross-head on the pitman is in line with its pivotal connection to the lever and the pivotal point of said lever, substantially as and for the purpose specified.

2. In a check-row corn-planter, the combination, with the rock-plate and sector and pinion gear, of a connecting-rod joining said plate and gear, the seed-slide lever, and a connecting-rod joining the same to the gear, substantially as described.

3. In a check-row corn-planter, the combination, with forked lever C, and with pitman C′, having a cross-head, $c^3$, mounted in ways $a^6$, of the reciprocating pawls D′, pivoted to rock-plate D, and provided with the guards $d^2$ and overlapping cams $d^4$, substantially as described.

4. In a check-row attachment for corn-planters, the combination, with a lever to receive the check-row wire or cord, of a pitman, reciprocating pawls, a rock-plate, a sector and pinion gear, and a lever to operate the seed-slides, the gear being severally joined to the plate and seed-slide lever by suitable connecting-rods, all substantially as set forth.

5. In a check-row attachment for corn-planters, the combination, with the head-bar having the usual guides for the wire or cord, of a forked lever, a pitman pivoted thereto, and carrying a cross-head to engage with ways in said head-bar, reciprocating pawls sustained on tracks of said head-bar, and a rock-plate pivoted thereto, substantially as described.

6. In a check-row corn-planter, in combination with the check-row wire or cord, swinging forked lever on which it acts, and a pitman or pawl hinged to said forked lever, a rocking plate having sliding pawls hinged or pivoted thereto—one on each side of its pivotal point—which sliding pawls are adapted to be acted upon alternately by the pitman or pawl hinged to the forked lever, substantially as and for the purpose specified.

7. In a check-row corn-planter, in combination with the check-row wire or cord, swinging forked lever on which it acts, and a pitman or pawl hinged to said forked lever, the sliding pawls adapted to receive motion alternately from the pitman hinged to the forked lever, substantially as and for the purpose specified.

In testimony whereof I affix my signature in presence of two witnesses.

JAMES EDWARD BERING.

Witnesses:
JULIUS BROEHL,
W. E. HENKLE.